United States Patent [19]

Blättry et al.

[11] 4,352,500
[45] Oct. 5, 1982

[54] CLAMPING CHUCK FOR TURNING MACHINES

[75] Inventors: Hans Blättry, Meerbusch; Herbert Antoni, Grevenbroich, both of Fed. Rep. of Germany

[73] Assignee: Paul Forkardt Kommanditgesellschaft, Düsseldorf, Fed. Rep. of Germany

[21] Appl. No.: 229,397

[22] Filed: Jan. 29, 1981

[30] Foreign Application Priority Data

Feb. 14, 1980 [DE] Fed. Rep. of Germany ....... 3005459

[51] Int. Cl.³ ............................................. B23B 31/14
[52] U.S. Cl. ................................... 279/121; 279/123
[58] Field of Search ....................... 279/121, 123, 1 C

[56] References Cited

U.S. PATENT DOCUMENTS

| | | | |
|---|---|---|---|
| 3,656,773 | 4/1972 | Blättry | 279/121 |
| 3,765,691 | 10/1973 | Saruhashi | 279/121 X |
| 4,007,943 | 2/1977 | Scharfen | 279/121 |
| 4,026,566 | 5/1977 | Rohar | 279/121 |
| 4,200,300 | 4/1980 | Rohar | 279/121 X |
| 4,240,645 | 12/1980 | Rohar | 279/1 C |
| 4,243,237 | 1/1981 | Rohar | 279/121 |

FOREIGN PATENT DOCUMENTS

| | | | |
|---|---|---|---|
| 5459 | 11/1979 | European Pat. Off. | 279/121 |
| 2711904 | 9/1978 | Fed. Rep. of Germany | 279/121 |
| 2821848 | 11/1979 | Fed. Rep. of Germany | 279/121 |

Primary Examiner—William R. Briggs
Attorney, Agent, or Firm—Martin A. Farber

[57] ABSTRACT

A chuck for lathes having a chuck body in which at least two clamping jaws which can be jointly actuated by a drive member are guided in radially displaceable manner, the jaws consisting in each case of a drive jaw part which is continuously in operative connection with the drive member and of a clamping jaw part which is guided for radial movement independently of the drive jaw part within the chuck body and can be connected in form-locked manner with the drive jaw part by a coupling piece arranged in the drive jaw part. The form-locked engagement of the coupling piece with the clamping jaw part can be eliminated via positive drive surfaces by a spring-loaded actuating member which is movable substantially radially and independently of other actuating members. In order to be able to develop the drive jaw parts lighter and nevertheless stronger and in order to assure a dependable connection between clamping jaw part and drive jaw part, the actuating member is arranged in the chuck body and connected via the positive guide surfaces with an intermediate member which is also mounted in the chuck body and is connected with the coupling piece in form-locked manner in the direction of action of the latter but in radial direction permits a free movement of the coupling piece with respect to the intermediate member.

6 Claims, 2 Drawing Figures

CLAMPING CHUCK FOR TURNING MACHINES

The present invention relates to a chuck for lathes which has a chuck body in which at least two clamping jaws which can be jointly actuated by a drive member are guided in radially displaceable manner, the jaws consisting in each case of a drive jaw part which is continuously in operative connection with the drive member and of a clamping joint which is guided for radial movement independently of the drive jaw part within the chuck body and can be connected in form-locked manner with the drive jaw part by a coupling piece arranged in the drive jaw part and can be connected in form-locked manner with it, the form-locked engagement of said coupling piece with the clamping jaw part being adapted to be eliminated via positive guide surfaces by a spring-loaded actuating member which is movable substantially radially and independently of other actuating members.

A chuck of the type described above is known from DE-OS 2 711 904. The coupling piece, which is supported in the drive-jaw part and can be retracted from its engagement with the clamping-jaw part by an actuating member which is associated with each clamping jaw, permits an individual displacement of the clamping jaw part with respect to the drive jaw part which is independent of the other clamping jaws, or an individual replacement of the clamping jaw parts. As compared with joint actuation of all coupling pieces by a single annular actuating member this known embodiment has the advantage that no clamping jaw part can drop unintentionally out of the chuck body but that each clamping jaw part is intentionally displaced or exchanged.

The known embodiment, however, has the disadvantage that, in addition to the coupling piece, the actuating member is also arranged in the drive jaw part of the clamping jaws so that, on the one hand, a relatively heavy drive jaw part which is sensitive to centrifugal force results, which part, on the other hand, is weakened by the recesses for the structural parts supported in it and in case of the breaking of the key hook provided for the drive of the clamping jaw can fly unimpeded out of the chuck body together with the clamping jaw part.

The object of the invention is to avoid the disadvantages of the known embodiment and to create a chuck whose drive jaw parts can be made lighter and nevertheless stronger and whose structural parts can be developed strong for the form-locked coupling between drive jaw part and clamping jaw part without regard to space conditions determined by the drive jaw part in order to assure a dependable connection between clamping jaw part and drive jaw part.

This object is achieved by the invention in the manner that the actuating member is arranged in the chuck body and connected via the positive guide surfaces with an intermediate member which is also mounted in the chuck body and is connected in form-locked manner with the coupling piece in the active direction of the latter, while in radial direction it permits free movement of the coupling piece with respect to the intermediate member.

By this development of the chuck in accordance with the invention a light construction of the drive jaw parts, which is thus less sensitive to centrifugal forces, is made possible. On the other hand, the actuating and intermediate members which are connected with each other via the positive guide surface are amply dimensioned and dependably guided due to their arrangement in the body of the chuck, whereby there is obtained greater mechanical stability and greater reliability, particularly as the intermediate member mounted in the chuck body can be so developed that in case of a break of the key wedge hook developed on the drive jaw, part the clamping jaw consisting of clamping jaw part, and drive jaw part is held fast in the body of the chuck.

In one preferred embodiment of the invention, the coupling piece is connected with the intermediate member by a dovetail groove which has its guide surfaces extending in radial direction. In this way there is obtained a particularly simple and dependable development which, on the one hand, produces a form-locked connection between coupling piece and intermediate member in the direction of action of the coupling piece and, on the other hand, permits free movement of the coupling piece corresponding to the movement of the drive jaw part with respect to the intermediate member.

In accordance with another feature of the invention, the connection between the intermediate member and the coupling piece is arranged within a recess in the body of the chuck, the recess having a radial length which corresponds to the maximum stroke of the drive jaw part. In this development, a part of the coupling piece extends into the recess in the chuck body so that in case of the breaking of the key wedge hook the coupling piece guided in the drive jaw part, by resting in the recess of the chuck body prevents the flying off both of the drive jaw part and of the clamping jaw part connected with it.

In order to prevent the clamping of a workpiece or the starting of the chuck when all clamping jaw parts are not dependably locked to the drive jaw parts, it is finally proposed, in accordance with the invention, that each actuating member be provided with a blocking part which extends into the field of movement of the drive member and by application of the drive member prevents the bringing of the clamping jaws into the clamping position, the blocking part being withdrawn from the field of movement of the drive member solely in the end position of the coupling piece which connects the clamping jaw part in form-locked manner with the drive jaw part. With this development in accordance with the invention assurance is had that movement of the actuating member for displacement of the clamping jaws, for instance an axial movement of a chuck piston connected via wedge hooks with the drive jaw parts, is only possible when all actuating members are in the end position in which the coupling piece engages fully and in form-locked manner into the corresponding clamping jaw part. By a control for the drive of the chuck which is dependent on the path of the drive member, assurance can be had in this way that the chuck cannot be placed in rotation if the blocking part of an actuating member extends into the region of movement of the drive member. Despite the independent actuation of the coupling pieces by in each case a separate actuating member, assurance is had in this way that the chuck of the invention can only be placed in operation when all clamping jaw parts present in the body of the chuck are dependably locked to the corresponding drive jaw part.

One embodiment of the chuck of the invention is shown by way of example in the drawing, in which.

Figure 1:
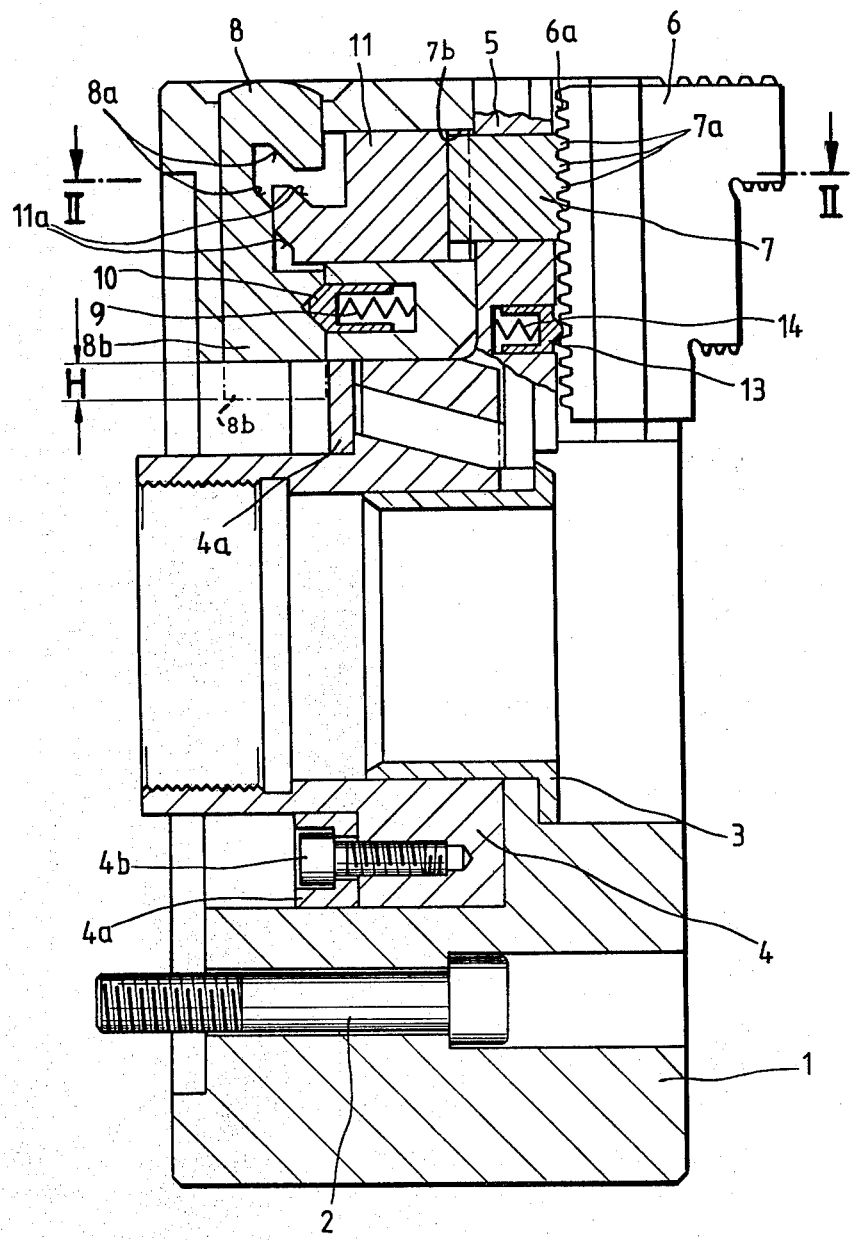
FIG. 1 is a longitudinal section through the chuck.
Figure 2:
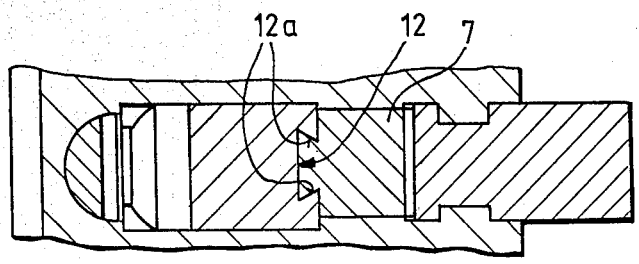
FIG. 2 is a partial section along the section line II—II of FIG. 1.

The chuck, which is developed, for instance, as a three-jaw chuck, has a chuck body 1 which is fastened by attachment screws 2 to a flange of a machine tool spindle (not shown). In a central borehole of the chuck body 1, which borehole is provided on its front side with a bushing 3, there is arranged a drive member developed as a chuck piston 4 which is operatively connected by a wedge hook connection with the clamping jaws so that axial movement of the chuck piston 4 results in radial movement of the clamping jaws.

Each clamping jaw consists of a drive jaw part 5 which is permanently in active connection with the chuck piston 4 by a key hook and of a clamping-jaw part 6. The drive jaw part 5 and the clamping jaw part 6 are guided movably, independently of each other, in radial guides of the chuck body 1, namely by lateral guide ridges which engage in corresponding grooves in the chuck body 1.

The connection between the drive jaw part 5 and the clamping jaw part 6 is effected by a coupling piece 7 which, in the embodiment shown, is provided on its front end face with a plurality of teeth 7a of trapezoidal profile which engage in form-locked manner into a corresponding toothing 6a on the rear of the clamping-jaw part 6. The coupling piece 7 is guided for movement in the drive-jaw part 5 in the axial direction of the chuck, i.e. parallel to the axis of rotation thereof. It can be pulled out at the rear of the chuck by its teeth 7a from the toothing 6a of the clamping-jaw part 6 so that the clamping-jaw part 6 can be displaced with respect to the driving jaw part 5 in order to change the clamping diameter or be removed completely from the chuck body 1, for instance in order to be placed in again after being turned by 180° or to be replaced by a clamping jaw part 6 of some other shape.

The actuation of the coupling piece 7 is effected by an actuating member 8 which is arranged in the chuck body 1 and can be actuated from the outside without the use of a tool. In the embodiment shown, the actuating member 8 is located in a radial borehole of the chuck body 1. It can be displaced radially to the axis of rotation out of the position shown in FIG. 1 against the force of a return spring 9. This return spring 9 is developed as a compression spring in the embodiment shown and arranged within a bolt 10 which is connected via an oblique surface with a corresponding oblique surface of the actuating member 8 so that the latter is always moved back by the return spring 9 into the starting position shown in FIG. 1 as soon as no force is exerted any longer in radial direction on the actuating member 8.

The actuating member 8 is provided with guide surfaces 8a which cooperate with corresponding guide surfaces 11a of an intermediate member 11 which is also mounted in the chuck body 1. In the embodiment shown, the intermediate member 11 is supported for displacement in the chuck body 1 parallel to the axis of rotation of the chuck and thus at a right angle to the direction of movement of the actuating member 8. At its end facing away from the actuating member 8 the intermediate member 11 is connected with the coupling piece 7. This connection is effected in such a manner that it is form-locked in the direction of action of the coupling piece 7 but permits free movement of the coupling piece 7 with respect to the intermediate member 11 in the radial direction of the chuck, i.e. at a right angle to the direction of action of the coupling piece 7.

This type of connection is effected in the embodiment shown by a dovetail guide 12 whose guide surfaces 12a are directed in the radial direction of the chuck body 1. In this way, upon a movement of the intermediate member 11 parallel to the axis of rotation of the chuck, the coupling piece 7 is carried along in form-locked manner while the coupling piece 7 is freely movable in radial direction of the chuck with respect to the intermediate member 11 so that the coupling piece 7 can, upon radial displacement of the drive jaw part 5 with respect to the chuck body 1, move unimpeded with respect to the intermediate member 11.

The dovetail guide 12 which serves as a connection between the intermediate member 11 and the coupling piece 7 is arranged, in the embodiment shown, within the recess 7b in the chuck body 1 which receives the intermediate member 11 so that the rear part of the coupling piece 7 continuously extends into the chuck body 1. In the event of the breaking wedge hook which connects the drive jaw part 5 with the chuck piston 4 the coupling piece 7 which extends partially into the chuck body 1 and is lead in the drive jaw part 5, by abutment against the chuck body 1 thus prevents the drive jaw part 5 from being thrown out of the chuck body 1. In this connection the clamping jaw part 6 is also held fast in the chuck body 1 via the coupling piece 7.

By a radially inward directed push on the actuating member 8 its guide surfaces 8a come into operating connection with the guide surfaces 11a of the intermediate member 11. These obliquely arranged guide surfaces 8a and 11a which result in positive guidance pull the intermediate member 11 out of the end position shown in FIG. 1 to the left in the drawing. Via the dovetail guide 12 the coupling member 7 is carried along in form-locked manner so that its teeth 7a emerge from the toothing 6a of the clamping jaw part 6. As soon as this form-locked connection between coupling piece 7 and clamping jaw part 6 has been completely released, the clamping jaw part 6 can be displaced relative to the driving jaw part 5 and to the chuck body 1 or be removed completely from the chuck body 1. For this it is merely necessary to overcome the holding force of a detent bolt 13 which is under the force of a detent spring 14 and the rounded tip of which engages into a tooth gap of the toothing 6a. This detent bolt 13 is provided in order to bring the clamping jaw part 6 after a displacement or an insertion thereof at all times into a position in which the teeth 7a of the coupling piece 7 can engage dependably into the toothing 6a of the clamping jaw part 6.

When the actuating member 8 is released, the return spring 9, via the bolt 10 and the oblique surfaces developed on the bolt 10 and on the actuating member 8, presses the actuating member 8 back into the end position shown in FIG. 1. In this connection, the positive (i.e. the constrained) guide surfaces 8a and 11a effect a return of the intermediate member 11 and of the coupling piece 7 into the end position shown in FIG. 1, in which the coupling piece 7 locks the clamping jaw part 6 in form-locked manner to the drive jaw part 5. By the resting of the end side of the intermediate member 11 which faces away from the coupling piece 7 against a corresponding surface on the actuating member 8 assurance is had, in the locked position shown in FIG. 1, that the coupling piece 7 cannot have its teeth 7a pulled out of the toothing 6a of the clamping jaw part 6 without intentional actuation of the actuating member 8.

Although each actuating member 8 can be actuated individually and independently of other actuating members in order to uncouple the clamping-jaw part 6 from the drive jaw part 5, provision is made in the embodiment shown that a clamping process or a placing in operation of the chuck can only take place when all clamping-jaw parts 6 are properly connected with the drive jaw parts 5.

For this purpose, each actuating member 8 has a blocking part 8b which extends into the field of movement of the chuck piston 4 when the actuating member 8 is depressed. This is indicated in dash-dot line in FIG. 1. These dash-dot lines indicate the position of the blocking part 8b when the actuating member 8 has been depressed into the chuck body 1 by its maximum stroke H.

FIG. 1 clearly shows that not only upon the complete depression of the actuating member 8 but also upon its partial depression, movement of the chuck piston 4 in axial direction is prevented since this chuck piston 4 comes against the blocking part 8b of the actuating member 8. In this way the result is obtained that a movement of the chuck piston 4 which results in a clamping movement of the clamping jaws is prevented as long as one actuating member 8 is in the region of movement of the chuck piston 4. Movement of the chuck piston 4 can take place only when all coupling pieces are in the end position which connects the clamping jaw part 6 in form-locked manner with the drive jaw part 5. If this movement is monitored by a path-dependent switch it is possible, at the same time, to prevent the chuck from being placed in rotation as long as the chuck piston 4 is still in the front end position shown in FIG. 1 in which the clamping jaws are open.

In order to obtain a precise resting of the chuck piston 4 against the blocking parts 8b of the actuating members 8 which is adapted to the specific case of use, the chuck piston 4 is provided on its rear side in the embodiment shown with a stop ring 4a which is fastened to the chuck piston 4 by several screws 4b. This stop ring 4a can be provided, within the region of the actuating members 8, with oblique surfaces which press the actuating members 8 via oblique surfaces developed thereon into the interlock position shown in FIG. 1 as soon as the chuck piston 4 is actuated.

I claim:

1. In a chuck for lathes having a chuck body in which at least two clamping jaws which can be jointly actuated by a drive member are guided in radially displaceable manner, said jaws comprising in each case a drive jaw part which is continuously in operative connection with the drive member and a clamping jaw part which is guided for radial movement independently of the drive jaw part within the chuck body and can be connected in form-locked manner with the drive jaw part by a coupling piece arranged in the drive jaw part, the form-locked engagement of said coupling piece with the clamping jaw part being adapted to be released via positive guide surfaces by a spring-biased actuating member which is movable substantially radially and independently of other actuating members, the improvement comprising an intermediate member is displaceably mounted in the chuck body,
said actuating member is arranged in the chuck body and is operatively connected with said intermediate member via the positive guide surfaces,
said coupling piece is displaceably mounted in a direction of action and is connected in form-locked manner with said intermediate member in the direction of action of said coupling piece and is radially and displaceably mounted relative to said intermediate member, whereby in the radial direction free movement of the coupling piece with respect to the intermediate member may occur.

2. The chuck according to claim 1, wherein
said intermediate member and said coupling piece are formed with a cooperating dovetail guide which has guide surfaces directed in the radial direction, the coupling piece being connected with the intermediate member by said dovetail guide constituting the form-locked connection.

3. The chuck according to claim 1 or 2, wherein
said chuck body is formed with a recess having a radial length,
the connection between the intermediate member and the coupling piece is disposed within said recess in the chuck body, the radial length of said recess permitting a maximum stroke of the drive jaw part limited radially outwardly by abutment of the coupling piece against the chuck body.

4. The chuck according to claim 1, wherein
a plurality of said spring-biased actuating members having a blocking part movable into a region of movement of the drive member, so as to block said drive member upon applying the drive member, thereby preventing transfer of the clamping jaws into a clamping position,
said blocking part being mounted retractable from the region of movement of the drive member solely in an end position of the coupling piece in which end position the latter connects the clamping jaw part in form-locked manner with the drive jaw part.

5. The chuck according to claim 1, wherein
said direction of action is parallel to the longitudinal axis of the chuck body.

6. The chuck according to claim 1, wherein
said actuating member is formed with an abutment surface and is mounted in the chuck body such that in the form-locked engagement of said coupling piece with the clamping jaw part an end side of said intermediate member facing away from said coupling piece abuts said abutment surface holding said coupling piece in said form-locked engagement of said coupling piece with the clamping jaw part.

* * * * *